United States Patent
Lewinter et al.

(10) Patent No.: US 11,727,517 B2
(45) Date of Patent: Aug. 15, 2023

(54) INSTRUCTIONAL DESIGN AND DEVELOPMENT INTERFACE

(71) Applicant: Pearson Education, Inc., Bloomington, MN (US)

(72) Inventors: Russell I. Lewinter, Orlando, FL (US); Amy Wood, Alexandria, VA (US)

(73) Assignee: PEARSON EDUCATION, INC., Bloomington, MN (US)

( * ) Notice: Subject to any disclaimer, the term of this patent is extended or adjusted under 35 U.S.C. 154(b) by 0 days.

(21) Appl. No.: 16/945,470

(22) Filed: Jul. 31, 2020

(65) Prior Publication Data

US 2020/0364815 A1 Nov. 19, 2020

Related U.S. Application Data

(63) Continuation of application No. 14/280,411, filed on May 16, 2014, now abandoned.

(60) Provisional application No. 61/824,259, filed on May 16, 2013.

(51) Int. Cl.
 *G06Q 10/00* (2023.01)
 *G06Q 50/20* (2012.01)
 *G06Q 10/10* (2023.01)

(52) U.S. Cl.
 CPC ......... *G06Q 50/205* (2013.01); *G06Q 10/10* (2013.01)

(58) Field of Classification Search
 CPC .................................................... G06Q 50/205
 See application file for complete search history.

(56) References Cited

U.S. PATENT DOCUMENTS

| | | | | |
|---|---|---|---|---|
| 7,362,997 | B2 * | 4/2008 | Hartenberger | G09B 7/00 434/322 |
| 2002/0031756 | A1 * | 3/2002 | Holtz | G09B 7/07 434/362 |
| 2002/0188583 | A1 * | 12/2002 | Rukavina | G09B 5/00 706/45 |
| 2003/0027121 | A1 * | 2/2003 | Grudnitski | G09B 7/00 434/308 |
| 2006/0199163 | A1 * | 9/2006 | Johnson | G09B 5/00 434/322 |
| 2006/0252022 | A1 * | 11/2006 | Matthews | G09B 5/00 434/350 |
| 2011/0212430 | A1 * | 9/2011 | Smithmier | G09B 7/00 434/322 |
| 2012/0208163 | A1 * | 8/2012 | Dwyer | G06Q 10/101 434/322 |
| 2013/0089847 | A1 * | 4/2013 | Baker | G06Q 50/205 |

(Continued)

*Primary Examiner* — Gabrielle A McCormick
(74) *Attorney, Agent, or Firm* — Quarles & Brady LLP

(57) ABSTRACT

Methods and systems are disclosed for interactively developing an educational course and the materials for it using a backward design, or top-down, approach based on course objectives and course outcomes in one embodiment. Educators or other course creators are able to implement this design approach through an Integrated Design and Development Interface (IDDI). The IDDI guides course development by organizing course content in a relational database. The IDDI maps a plurality of course objectives to a plurality of course outcomes to create a course model. The IDDI uses the course model to generate and/or automatically user interfaces used by a course creator to input lower-level course information.

20 Claims, 11 Drawing Sheets

(56) References Cited

U.S. PATENT DOCUMENTS

| | | | | |
|---|---|---|---|---|
| 2013/0325665 A1* | 12/2013 | Shaffer | ............... | G06Q 50/20 |
| | | | | 705/26.61 |
| 2014/0272892 A1* | 9/2014 | Rozycki | ............... | G09B 5/08 |
| | | | | 434/350 |
| 2014/0344364 A1* | 11/2014 | Phua | ............... | G06Q 10/00 |
| | | | | 709/204 |

* cited by examiner

| Course Home |
|---|
| Syllabus |
| Objectives |
| Checklist |
| Discussion |
| Assignment |
| Quiz |
| LMS Activity |
| Course Level Assessment |

Shared Text Field with Syllabus*

Course Home

*Business Communication*
Course Home

Course Outcomes — 214

This course provides the foundations of all types of business communication including letters, memos, electronic communication, written reports, oral presentations, and interpersonal communication. The course also includes topics of resumes, application letters, interviewing tips, interviewing tips, and employment follow-up documents.

At the end of this course, students will be able to:* — 212

- Evaluate elements of effective business communication
- Explain barriers that can create ineffective communication
- Analyze ethical issues related to communication
- Examine how technology has impacted business communications
- Explain the importance of intercultural communication in the business setting ( Save & Close )

FIG. 5

| Course Home |
| Syllabus |
| Objectives |
| Checklist |
| Discussion |
| Assignment |
| Quiz |
| LMS Activity |
| Course Level Assessment |

Objective Pages

 Lesson 1: Introduction to Business Communications
Objectives

Lesson 1 Objectives

At the end of this lesson...

- Explain how effective business communication is achieved
- Examine tools used for effective business communications
- List communication barriers
- Describe the impact that technology has had on business communications
- Analyze ethical issues related to communication

212

( Save & Close )

FIG. 7

*Curriculum in Early Childhood* 800

Outcomes

Course Description:
This course prepares teacher candidates for success in planning and teaching in the early childhood classroom, ages birth through eight. Emphasis is placed on appropriate content knowledge and teaching strategies that incorporate information related to child development, learning theories, and the use of assessment and standards in the early childhood years. Teacher candidates will explore various models of instruction as they develop lesson plans and activities that are appropriate for young children. Prior knowledge of child development and familiarity with early childhood classrooms are recommended for success.

Student Audience:
Students taking this class are applying the knowledge that they have acquired in previous child development courses to create quality lessons and experiences for young children, ages birth through eight.

810 — Analyze the degree to which a learning experience reflects a developmentally appropriate practice

820
- Recognize the relationship between developmentally appropriate practices and quality
- Explain the three areas of knowledge (age-related expectations, individual differences, and social and cultural contexts) that form the core of developmentally appropriate practice
- Explain the role of active child engagement in developmentally appropriate practice
- Analyze stages of play in relation to developmentally appropriate practice

Explain how curriculum is affected by theories, models, government programs, and standards
- Compare the major early childhood theories
- Compare early childhood education program models
- Describe how federal- and state-based programs have impacted early childhood
- Describe what standards might affect curriculum development in the early years
- Explain the benefits and concerns of using standards in early childhood education
- Explain how early learning guidelines and state standards can be used in curriculum development

Create a plan to establish reciprocal relationships with families
- Describe the benefits of establishing reciprocal relationships with families
- Critique different communication strategies for establishing reciprocal relationships with families
- Compare ways of involving families in curriculum development and implementation

Plan developmentally appropriate learning environments for children ages 0-8
- Evaluate a child-teacher relationship for children 0-8 to determine if it is warm and caring within a developmentally appropriate environment.
- Describe appropriate guidance techniques for a given situation
- Critique a schedule for learning opportunities
- Critique a physical environment for learning opportunities

FIG. 8

*Curriculum in Early Childhood*
Course Blueprint

Course Description:
This course prepares teacher candidates for success in planning and teaching in the early childhood classroom, ages birth through eight. Emphasis is placed on appropriate content knowledge and teaching strategies that incorporate information related to child development, learning theories, and the use of assessment and standards in the early childhood years. Teacher candidates will explore various models of instruction as they develop lesson plans and activities that are appropriate for young children. Prior knowledge of child development and familiarity with early childhood classrooms are recommended for success.

Student Audience:
Students taking this class are applying the knowledge that they have acquired in previous child development courses to create quality lessons and experiences for young children, ages birth through eight.

Lesson 1: Developmentally Appropriate Practice

Outcomes:
- Analyze the degree to which a learning experience reflects a developmentally appropriate practice

Presented:
Topic 1: Quality
- Recognize the relationship between developmentally appropriate practices and quality

Topic 2: Developmentally Appropriate Practices
- Explain the three areas of knowledge (age-related expectations, individual differences, and social and cultural contexts) that form the core of developmentally appropriate practice

Topic 3: Active Child Engagement
- Explain the role of active child engagement in developmentally appropriate practice

Topic 4: Play
- Analyze stages of play in relation to developmentally appropriate practice

Assessed:
Assignment 1.1: Active Engagement
- Explain the role of active child engagement in developmentally appropriate practice
- Analyze stages of play in relation to developmentally appropriate practice

Discussion 1.1: Introductions
- Recognize the relationship between developmentally appropriate practices and quality

Discussion 1.2: Why DAP?
- Explain the three areas of knowledge (age-related expectations, individual differences, and social and cultural contexts) that form the core of developmentally appropriate practice
- Explain the role of active child engagement in developmentally appropriate practice

Quiz 1: Developmentally Appropriate Practice

FIG. 9

INSTRUCTIONAL DESIGN AND DEVELOPMENT INTERFACE

CROSS-REFERENCE TO RELATED APPLICATIONS

This application is a continuation of U.S. patent application Ser. No. 14/280,411 filed on May 16, 2014, and entitled "INSTRUCTIONAL DESIGN AND DEVELOPMENT INTERFACE, which claims benefit of U.S. Provisional Application No. 61/824,259 filed on May 16, 2013, and entitled "INSTRUCTIONAL DESIGN AND DEVELOPMENT INTERFACE," the entire contents of which are incorporated herein by reference for all purposes.

BACKGROUND OF THE INVENTION

This disclosure relates in general to instructional design and development and, but not by way of limitation, to tools that speed course development while producing better end product.

Course design is difficult. The subject is generally known and different content is gathered to string together a course. This approach is bottom-up in that the content for the course is gathered before the design of the course is determined. Often there is over-emphasis in areas that have readily available material. For example, a text book on the subject will often dictate the course design to match the authors approach. The educator may have a completely different approach to the desired subject, but the text establishes the framework in a bottom-up design of a course.

In the process of designing a course, the overall objectives and outcomes can be lost. Material is gathered along with a syllabus, course outline, and/or lesson plan. Modifications to the syllabus must be manually propagated to the course outline and lesson plan. Educators spend countless hours designing a new course because of the manual processes involved. With the increasing pace of curricula evolution, it is difficult for educators to keep their courses fresh and current.

Interactively developing an educational course is relatively easy when there are only a few users. However, as the number of users and the complexity of the course increases, difficulties may arise. For example, edits or additions to one component, such as a syllabus, may not be incorporated into a lesson plan. Each user may have to be aware of another user's changes to correctly enter a new contribution to the course development. There may not be an explicit organization to the course. The components of the course, whether a high-level component such as a syllabus, or low-level component, such as a particular example, may not be contributed in a specific sequence, making editorial work difficult. The focus when using bottom-up design is on specific aspects of the course and not on the course overall or the objectives or desired outcomes of the course. If such highest level aspects of a course change during development, much of what was contributed up to the change may need significant revision.

BRIEF SUMMARY OF THE INVENTION

In an embodiment, a top-down method for electronically creating an educational course is disclosed that comprises the following aspects. Course objectives are received from an educator for the educational course; a course objective is a goal to be achieved by a student taking the educational course. Course outcomes are received from the educator; a course outcome is a skill that demonstrates at least partial achievement of a corresponding course objective. Input from the educator is received that is related to mapping between the course objectives to the course outcomes. The course objectives are mapped to the plurality of course outcomes to create a course model, and the course model is stored. Interface pages are generated and prepopulated with previously received information in the course model; the interface pages include two or more of a course outline interface, a lesson plan interface, and a course syllabus interface. Course information that is entered by the educator in the interface pages is received from the interface pages. The course model is updated with the course information.

In another embodiment a computer program product embodied on a non-transitory computer-readable medium is disclosed. The computer program product comprises code that when executed by one or more processors causes the processors to perform a top-down method for electronically creating an educational course. The code comprises instructions to receive course objectives from an educator for the educational course; a course objective being a goal to be achieved by a student taking the educational course. The code also includes instructions to receive course outcomes from the educator; a course outcome being a skill that demonstrates at least partial achievement of a corresponding course objective. The code also includes instructions to receive input from the educator related to mapping between the course objectives to the plurality of course outcomes, and performing the map between the course objectives and the course outcomes to create a course model that is then stored.

The code also includes instructions to generate interface pages prepopulated with previously received information in the course model; the interface pages include two or more of a course outline interface, a lesson plan interface, and a course syllabus interface. The code also includes instructions to receive course information from the interface pages that is entered by the educator. The code also includes instructions to update the course model with the course information.

In another embodiment a system for electronically creating an educational course is disclosed. The system comprises a course model creation engine and a course component creation engine. The course model creation engine is configured to perform the following operations: (i) receive course objectives from an educator for the educational course, wherein a course objective is a goal to be achieved by a student taking the educational course; (ii) receive course outcomes from the educator, wherein a course outcome is a skill that demonstrates at least partial achievement of a corresponding course objective; (iii) receive input from the educator related to mapping between course objectives to the course outcomes; (iv) map the course objectives to the course outcomes to create a course model; and (v) store the course model.

The course component creation engine is configured to perform the following operations: (i) generate interface pages prepopulated with previously received information in the course model, the interface pages including two or more of a course outline interface, a lesson plan interface, and a course syllabus interface; (ii) receive course information from the interface pages that is entered by the educator; and (iii) update the course model with the course information.

BRIEF DESCRIPTION OF THE DRAWINGS

The present disclosure is described in conjunction with the appended figures:

FIG. 5 illustrates a user interface for entering Course Outcomes, according to an embodiment.

FIG. 7 illustrates a user interface for entering Course Objectives, according to an embodiment.

FIG. 8 illustrates a printed version of a generated Course Outcomes document, according to an embodiment.

FIG. 9 illustrates a printed version of a generated Course Blueprint document, according to an embodiment.

Figure 1:
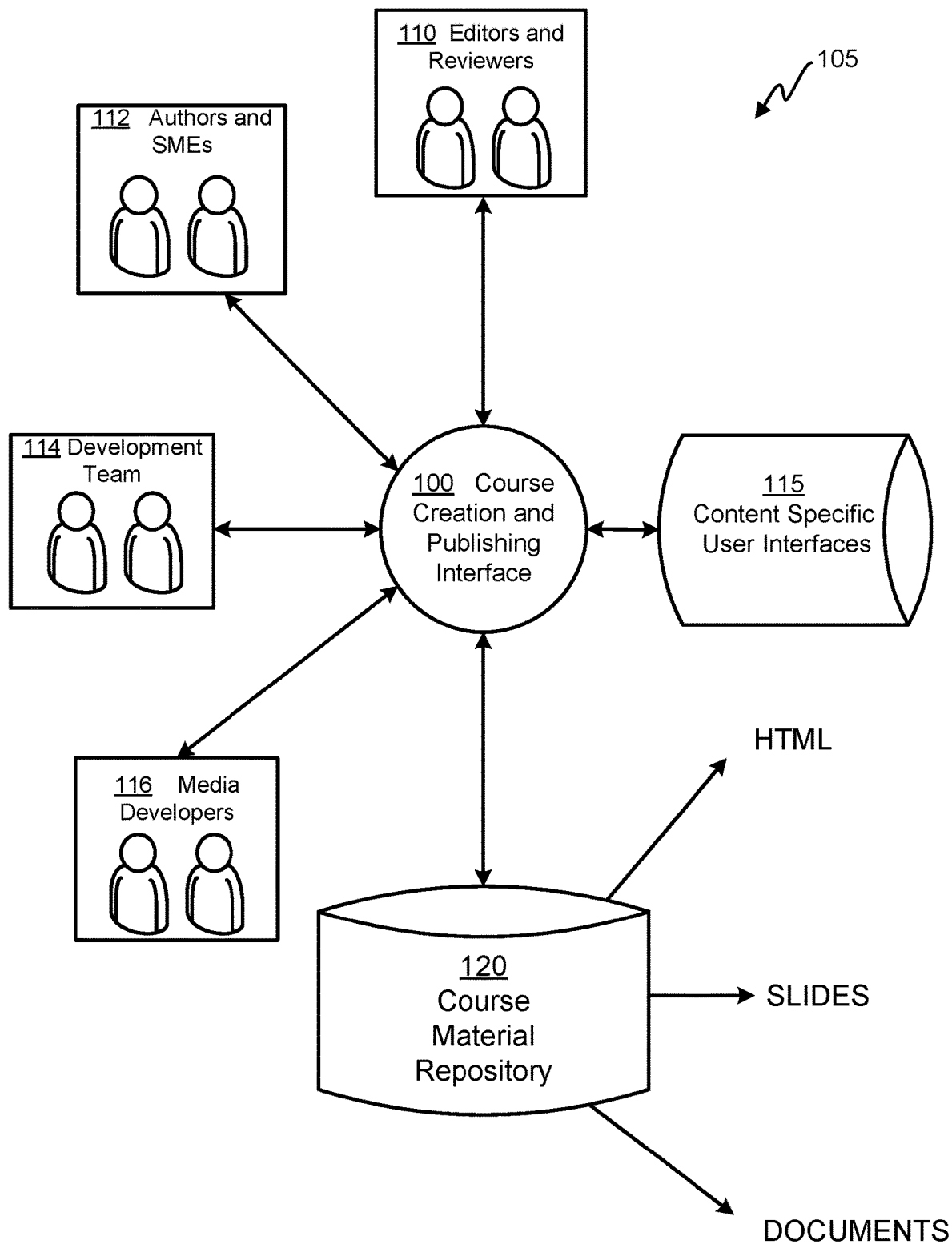
FIG. 1 shows a block diagram of a course creation system by which an educational course is developed from multiple user groups.

In the appended figures, similar components and/or features may have the same reference label. Where the reference label is used in the specification, the description is applicable to any one of the similar components having the same reference label.

DETAILED DESCRIPTION OF THE INVENTION

The present disclosure is directed to methods, systems and devices for creating and publishing educational course material, either in printed or various electronically accessible or readable versions. The ensuing description provides preferred exemplary embodiment(s) only, and is not intended to limit the scope, applicability or configuration of the disclosure. Rather, the ensuing description of the preferred exemplary embodiments(s) will provide those skilled in the art with an enabling description for implementing the preferred exemplary embodiment.

As a convenience, a non-exhaustive list of acronyms and terms used herein is provided. The detailed meaning of each acronym or term is given in subsequent paragraphs.

| | |
|---|---|
| CC | Course Creator |
| CCCE | Course Component Creation Engine |
| CCPI | Course Creation and Publishing Interface |
| CFM | Course Foundation Material |
| CO | Course Outcome |
| CMCE | Course Model Creation Engine |
| CYU | Check Your Understanding |
| IDDI | Instructional Design and Development Interface |
| GUI | Graphical User Interface |
| LCMS | Learning Content Management System |
| LMS | Learning Management System |
| LO | Lesson Objective |
| LP | Lesson Plan |
| PE | Publishing Engine |
| RP | Rights and Permissions |
| SME | Subject Matter Expert |
| UI | User Interface |

In one embodiment, creating and developing educational courses involves receiving inputs from various persons and a variety of sources, such as subject matter experts, instructional designers, digital libraries, authors, administrators, course instructors, media experts, and editors, among others. The people providing the input may be geographically separated while still developing a course collaboratively. This is often the case with educational courses that are to be delivered electronically to students, such as by video conferencing or other electronic media.

The content of several courses, especially courses in the same field, often comprise analogous components such as course syllabi, lesson structures, reading assignments, and assessment formats. An instructor may wish to use selected chapters from more than one text for a course for flexible choices of subject matter content. In order to develop a course quickly, the various persons or groups providing input to the course development are able to interact and collaborate quickly, flexibly and consistently, while maintaining transparency and version control. Persons or groups providing input often work through a shared or commonly accessible system that provides organization of the course content and a structured interface through which those collaborating to develop the course can enter course content. The system can also allow for review, editing and version control of course content.

FIG. 1 shows an embodiment of a block diagram of a course creation system 105 for interactively developing an educational course. The course is developed by multiple users or user groups that contribute or modify content of the course by interacting through a course creation and publishing interface (CCPI) 100. As used herein the term 'user' may denote either a single person or a group of persons contributing to the development of the course. The terms 'user group,' 'course creator' or 'educator' will also be used to denote either a single person or a group of persons contributing to the development of the course. The interface may be accessed directly through a monitor linked to a computer system that implements the interface, or by a network connection such as a LAN or the Internet. Other access methods may be used. By allowing various access methods the distinct users may be separately located.

The interface may be implemented using at least one computer system. The interface may comprise a relational database that correlates course content entered by the users. The interface may often be implemented by first presenting a preliminary graphical user interface (GUI) to a display device of a user to that allows the user to select content to access. The interface may be implemented to provide one or more content specific subsidiary user interfaces (UIs) to display devices of the users that allow the users to enter specific information of the course content that is then returned and stored by the Course Creation and Publishing Interface. For example, one subsidiary UI may allow a user to enter images or other visual media, while another UI may be configured to allow a user to enter a course syllabus and textbook choice. The Course Creation and Publishing Interface will access and provide a subsidiary UI from the repository 115 of all such subsidiary UIs.

By using a preliminary common interface, multiple users may contribute to development of an educational course. This can allow for specialization by the users for developing particular aspects of the course. For example, one user or user group may comprise subject matter experts 112 tasked with providing the basic content of the course. Such users may comprise lecturers or instructors who will conduct the class, authors who compose lectures or presentations, or experts who produce supplemental explanatory material. For example, one subject matter expert may be a biologist who will generate lessons or lectures for an introductory zoology course. Another subject matter expert may be an entomologist tasked with providing supplemental reading material related to the specialized subject of insect zoology.

Another user or user group may comprise media developers 116 tasked with producing or obtaining visual or audio materials. For example, such materials may comprise still photos, video clips or sound recordings that are related to the subject matter of a lesson. Such media may enhance and clarify the subject matter being presented in particular lessons. Media developers may also be tasked with developing user interfaces by which students may access course materials, and may interact with the course. For example, secure user interfaces may be created by the media developers for student testing or assessment.

Another user may comprise Editors and Reviewers 110 that perform checking and oversight tasks for the course content submitted either by the SMEs 112 or the Media Developers 116. Part of the oversight provided by the editors and reviewers can be to ensure the course content follows an overall plan for the course.

Another user may be a Development Team 114 that may initiate development of an educational course, provided copyrighted material, maintain one or more computer systems implementing the Course Creation and Publishing Interface, and provide other logistical support or assistance to the other users. The Development Team may perform other tasks as needed to ensure the successful development of the educational course.

The users and user groups discussed above are exemplary only. In other situations there may be more, fewer or different users. Further, the tasks of various users may be combined, or assigned differently.

Once all the users have completed the development of the course, the course is stored in a course material repository 120 for dissemination to course users. The educational course may be stored in the repository in any of a number of ways, including printed form, such as a published textbook or other printed form, electronic form maintained in a website, or on a computer readable medium such as a disk, nonvolatile memory, or other means. The presentation format of the educational course could be presentation slides, HTML web pages, and/or printed pages, whether physically rendered on paper, or maintained in an electronically readable format.

In one embodiment, a method of developing an education course is based on the principle of backward design flow. A goal of backward design flow, also termed 'top-down design,' is to ensure that multiple users contributing to the development of an educational course proceed sequentially starting from a commonly agreed upon set of end results. The course development proceeds by levels, and only upon completion of each level does the development of course content of the next level begin. While revisions to higher level content is allowed for after development of course content on the next level has begun, the paradigm of top-down development based on final course objectives and outcomes is maintained. Such revisions to higher level content causes related revisions in the lower level content and vice versa.

Using top-down design methodology assists the educator in focusing attention on the Course Objectives and Course Outcomes. A Course Objective is a goal to be achieved by a student taking the educational course. For example, in a Marketing course, a student objective would be having the ability to analyze how characteristics of a business determine a desired population demographic. Related to Course Objectives are Course Outcomes, which are skills that demonstrate at least partial achievement of a corresponding Course Objective. For example, in the Marketing course, a Course Outcome related to the Course Objective above would be a statistical analysis of a current customer base. To create a Course Model, Course Objectives are mapped to Course Outcomes.

Figure 2:
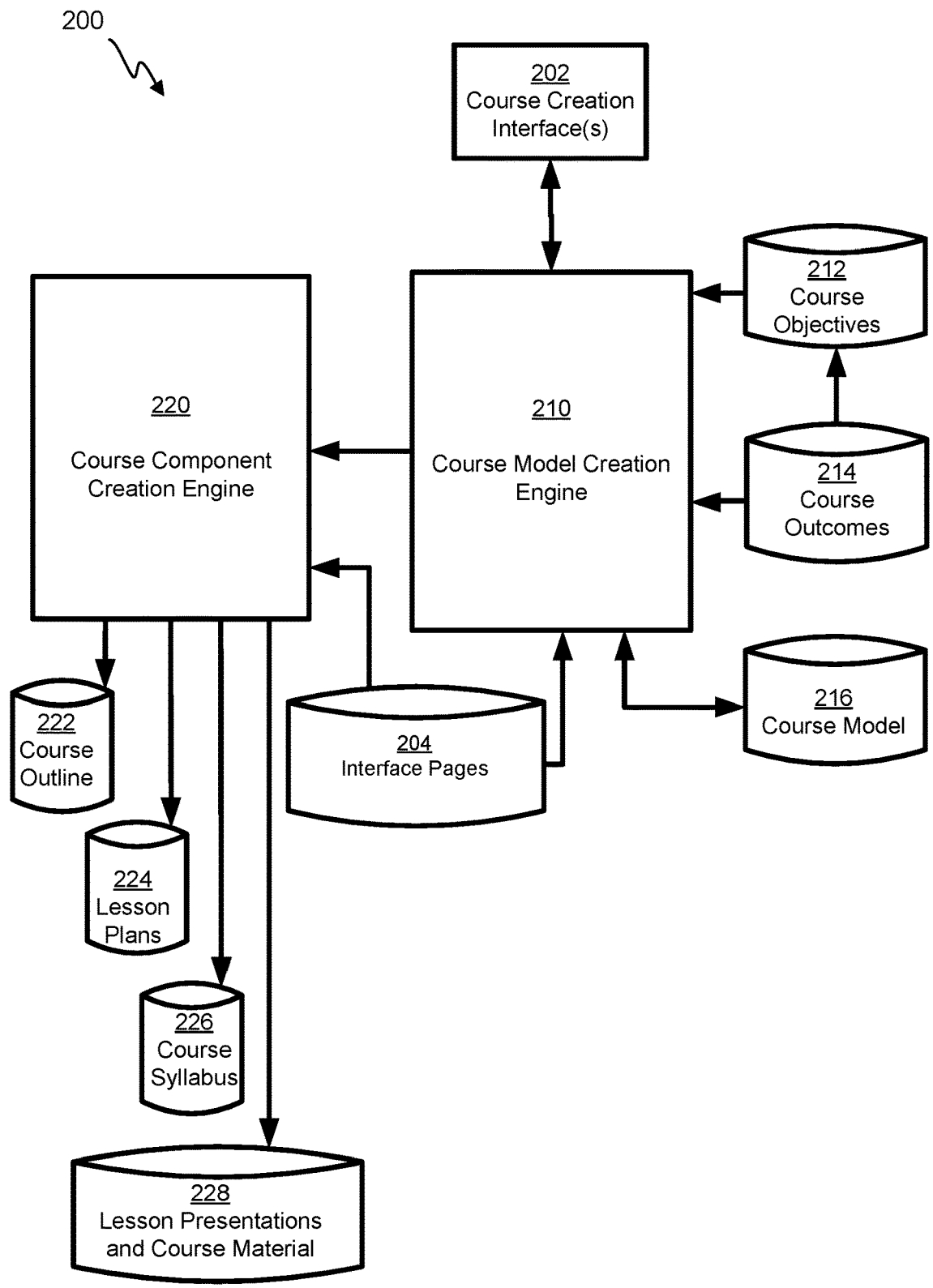
FIG. 2 shows a block diagram of method of coordinating development of an educational courses by multiple users, according to an embodiment.

Referring next to FIG. 2, an embodiment of a block diagram of an Integrated Course Design and Development Interface (IDDI) 200 is shown for implementing top-down course design and development. The IDDI 200 is implemented either directly in electronics hardware or as software implemented using a computer system such as are discussed below. One or more users or educators of the IDDI 200 interact through course creation interfaces 202.

A course model creation engine (CMCE) 210 gathers Course Objectives 212 and Course Outcomes 214 from the user(s) along with the interrelationship between the Course Objectives 212 and Course Outcomes 214. A Course Model is created by the CMCE 210 using the objectives, outcomes and mapping. The Course Model 216 is stored by the CMCE 210. Sometimes the Course Model 216 is referred to as a Course Blueprint. In one embodiment, the Course Model 216 is implemented in a relational database and stores all the information for a particular course including objectives 212, outcomes 214, course information, quiz material, etc.

The course component creation engine (CCCE) 220 gathers additional information from users and produces the output from the IDDI 200. The additional information is gathered through interface pages 204 or GUIs to supplement the course model 216. The interface pages 204 may be partially complete course outlines 222, lesson plans 224, and course syllabi 226. From the start, the interface pages 204 include the Course Objectives 212 and Course Outcomes 214, but include other fields for entry by the user(s). As the fields are completed, the Course Model 216 is updated.

In electronic or print form, the CCCE 220 produces lesson presentations, course materials, etc. to aid in teaching the course. Additionally, print forms of the course outline 222, lesson plans 224, and course syllabus 226 can be printed or electronically produced. In one embodiment, a checklist is produced by the CCCE 220 to track progress in creating the course. The checklist is viewable by the users to track progress in creating the course.

Figure 3:
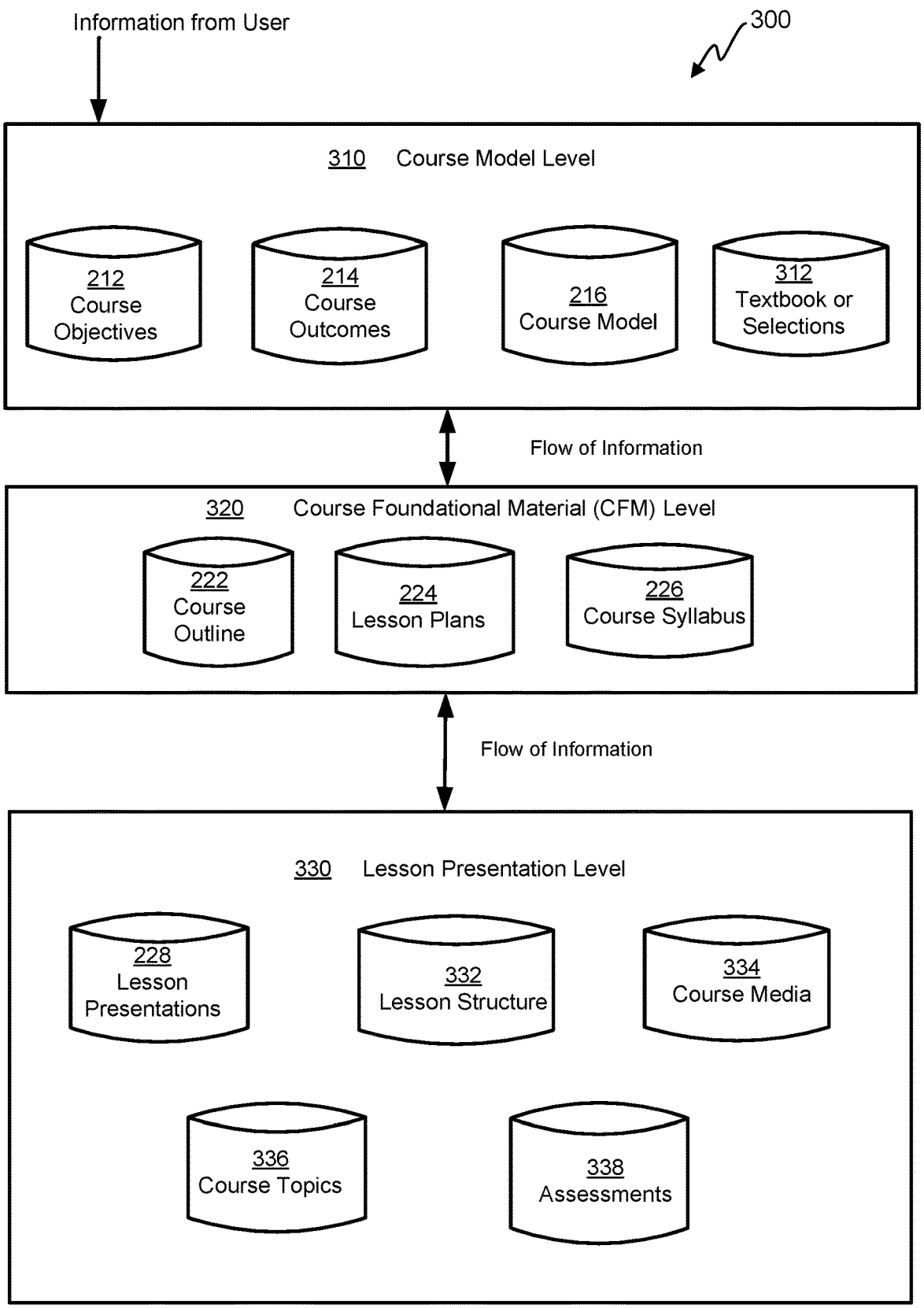
FIG. 3 shows a block diagram illustrating a sequence of levels for educational course development, according to an embodiment.

FIG. 3 illustrates an embodiment of a block diagram showing a hierarchy of levels 300 that illustrates various components or information categories of a course organized into three organizational levels 310, 320, 330 by an IDDI as part of a top-down course design methodology. The embodiment shows only three organizational levels 310, 320, 330, but more or fewer are possible in other embodiments. The number of organizational levels 310, 320, 330 used may depend on the overall difficulty of design of the educational course, and ultimate method by which the course is made available to students.

In this embodiment, the organizational levels 310, 320, 330 are arranged from top to bottom according to the importance of the course content categories where the broad themes are in a course model level 310, a course foundational material (CFM) level 320 in the middle and a lesson presentation level 330 at the bottom. Having course components or information categories organized into levels aids implementation of top-down design by allowing information entered or edited in a top level category to be incorporated, e.g. by the IDDI, into categories at lower levels and vice versa. Also, the organization assists the course creators in focusing on more important information categories first, which tend to be at the high levels. It is to be noted that information of the various course content categories at lower levels may also be incorporated, if necessary, into categories at higher levels.

The top-most Course Model Level 310 can be reserved for at least Course Objectives 212, Course Outcomes 214 and the interrelationship between them to form the basic Course Model 216. In other embodiments, other course content categories are added or moved into the Course Model Level 310, for example, the course reading material category, Textbook or Selections 312, is organized to be part of the Course Model Level 310, but could be in the CFM level 320 in other embodiments. One or more educators may contribute to any of the organizational levels 310, 320, 330, for example Course Model Level 310. The entered contributions, such as Course Outcomes 214 and Course Objectives 212, may then be used by the IDDI to update the Course Model 216, as explained above in relation to FIG. 2, and below in relation to FIG. 4. Information flows bidirectionally between organizational levels 310, 320, 330 such that manually entered or changed information at one level affects the other levels.

Figure 6:
FIG. 6 illustrates a user interface for entering information for a course syllabus, according to an embodiment.

When information within the four categories in the Course Model Level is established, even if only for a preliminary draft, the IDDI or other means can be used to update course information within the course content categories of the next level down, or within user interfaces by which further information for those categories can be entered. The CFM level 320 comprises content categories of Course Outline 222, Lesson Plans 224 and Course Syllabus 226. The CFM Level 320 typically includes course content categories related to details of the course organization and operations, though this is not required. FIG. 5 and FIG. 6 below illustrate an embodiment of how information from the Course Model Level is used to change a user interface used by an educator to access and edit content of a course syllabus.

The course content categories 222, 224, 226 with the CFM level 320 receives information from educators to complete those categories 222, 224, 226. Some of the information entered into a category of the CFM level 320 may affect the information in at least one category of the Course Model Level 310. This may occur if an educator realizes that addition of a topic within a Lesson Plan 224 may involve a supplement to the Course Outcomes 214. User interfaces provided by the IDDI to an educator for entry of course content in a category of the CFM level 320 may also allow entry for information for a category in the course model level 310. This is illustrated below in relation to FIG. 10. The changes within the course model level 310 is used to automatically update information throughout the CFM level 320. This illustrates that while modifications may be made to categories in a higher level even after information is being entered into categories of a lower level, nevertheless the overall top-down design flow is preserved. The course model 216 has all the information from all the levels 310, 320, 330 stored in a relational database as any of the hierarchy of levels 300 is modified.

In the event that the information within the categories of the second level is judged complete, the IDDI or other means can be used to update course information within the course content categories of the lesson presentation level 330, or within user interfaces by which further information for those categories can be entered. The Lesson Presentation level 330 includes course content categories of Lesson Presentations 228, Lesson Structures 332, Course Media content 334, Course Topics 336, and Assessments 338. The categories at the Lesson Presentation Level 330 typically relate to the specific subject matter of the course, though this is not necessarily required. As discussed above, information from the course model level 310 and CFM level 320 are used to update and/or modify the information within categories of the lesson presentation level 330 in order to implement top-down design flow.

Figure 4:
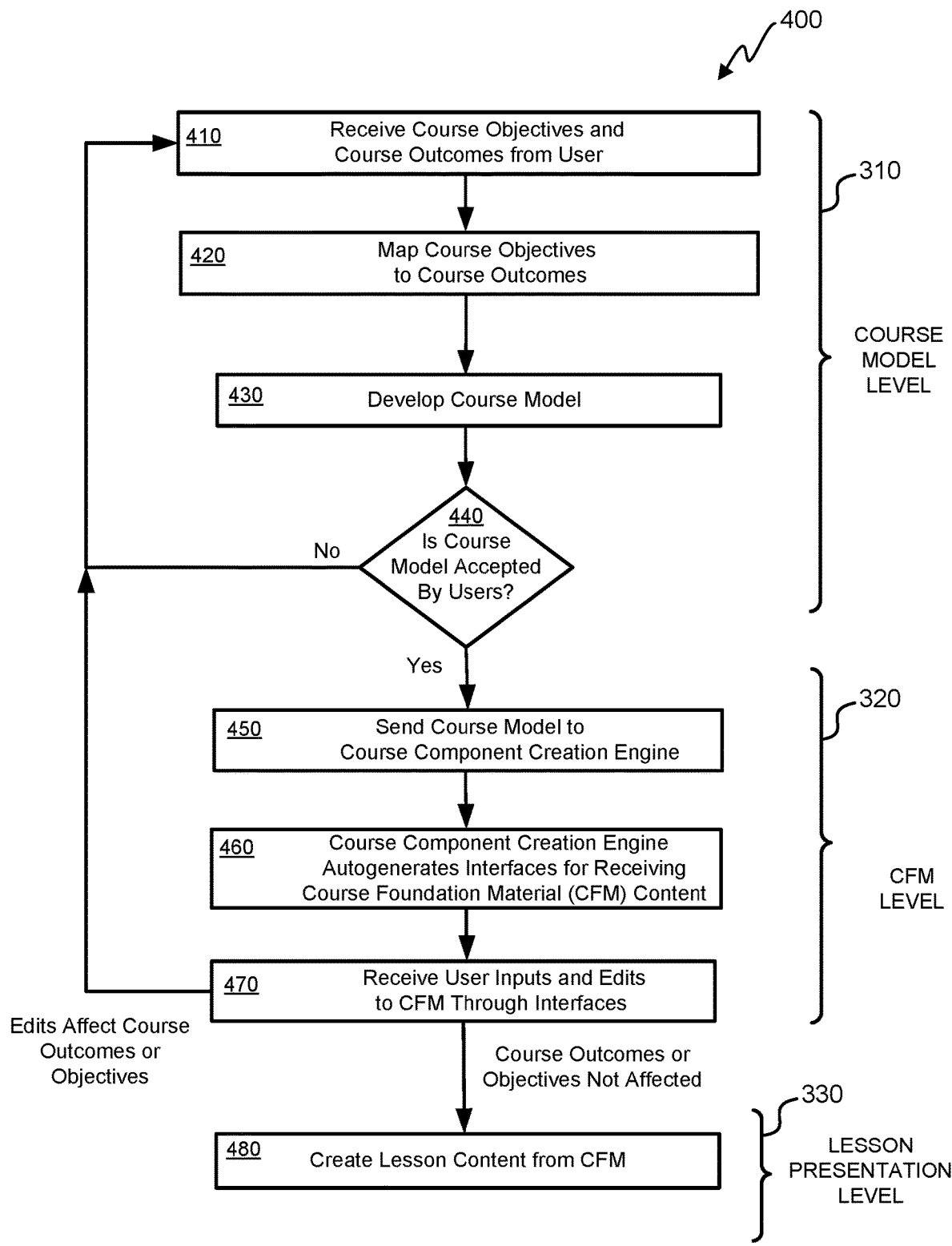
FIG. 4 is a flow chart illustrating stages for interactively developing an educational course, according to an embodiment.

Referring next to FIG. 4, a flow chart illustrates stages of a method 400 for interactively developing an educational course using top-down design flow, according to an embodiment. The stages of the method implement the levels 310, 320, 330 of the course content categories discussed in relation to FIG. 3.

At stage 410, the Course Objectives 212 and Course Outcomes 214 are received from a course creator or educator. This stage may allow for receiving information related to the Course Objectives 212 and Course Outcomes 214 from multiple educators. In one embodiment, the information is entered through a user interface on an electronic device of an educator. The user interface may, for example, have been accessed through an IDDI.

At stage 420, the received Course Objectives 212 are mapped to one or more Course Outcomes 214. The mapping can be based, for example, on how important a particular Course Objective 212 is to the achieving the Course Outcome 214. Alternatively, the mapping may be based on mapping information, e.g. importance correlation information, received from the educators.

At stage 430, the IDDI generates a Course Model 216 using the Course Objectives 212, the Course Outcomes 214 and the provided mapping information. The Course Model 216 may comprise relationships between the various course content categories, of any level 310, 320, 330, discussed in relation to FIG. 3. By performing stages 410, 420 and 430 first, the Course Model 216 ensures that top level information is incorporated in the categories of all levels. The Course Model may be implemented using a database, a relational database or a hierarchically arranged relational database. Other methods for maintaining relationships and interconnections, such as trees, graphs or multidimensional cell structures, may also be used in various embodiments.

At stage 440, once a Course Model 216 is generated, it may be reviewed by the educators and course creators. If the Course Model 216 is not deemed satisfactory for the educational course, the educators may update or revise the Course Objectives 212, Course Outcomes 214 and the mapping information and generate a revised Course Model 216. Otherwise, the Course Model 216 is used by the IDDI to be used to update and provide information for course content categories of other levels 310, 320, 330.

At stages 450 and 460, an acceptable Course Model is used by a Course Component Creation Engine (CCCE) to autogenerate user interfaces, at least in part, to be used by educators to submit content for categories in the CFM Level 320. The autogeneration populates the user interfaces, and some of the content of the categories, based on the Course Model 216.

At stage 470, the inputs and edits from an educator are received through the user interfaces. It may be that the inputs cause a need to modify the Course Objectives 212 or the Course Outcomes 214, as indicated by the return branch of the flowchart from stage 470. In this embodiment, the course design and development process can return to stage 410 in order to maintain backwards design flow.

Alternatively, if the inputs and edits at stage 470 do not cause a need to modify the Course Objectives or the Course Outcomes, the inputs and edits can be entered into the appropriate category of the CFM level 320.

At stage 480, the information in the course content categories of the CFM Level 320 can be incorporated into lesson content within categories of the Lesson Presentation Level 330. This can ensure that the specific subject matter content reflects the Course Outcomes 214 and Objectives 212.

Referring next to FIG. 5, a user interface 500 is shown by which an educator can enter Course Objectives 212 corresponding to at least one Course Outcome 214, according to an embodiment, for a Business Communication course. In the embodiment shown, the entered Course Objectives 212 are used by the IDDI to update the Course Model 216. The updated Course Model 216 is then used in forming other course components and other user interfaces and so implements top-design design flow as illustrated in the FIG. 6, as now explained.

FIG. 6 illustrates a user interface 600 for entering information for a course syllabus, according to the embodiment shown in FIG. 5. As explained above in relation to FIG. 5, once a Course Model 216 has been updated, the updated changes are implemented in other course content and other user interfaces. The edits to the Course Objectives 212 shown in FIG. 5 are automatically entered into a field for the Course Objectives 212 of user interface 600.

FIG. 7 illustrates an embodiment of a user interface 700 for entering Course Objectives 212. An educator may enter, edit or delete Course Objectives 212 in the entry field. When received by the IDDI the mapping between Course Objectives 212 and Course Outcomes 214 is updated. Once the mapping is updated, the Course Model 216 is updated to incorporate the changes. The updated Course Model 216 then is used for by the IDDI to update other user interfaces and course content of other levels of the hierarchy 300.

FIG. 8 illustrates a printed version 800 of a Course Outcomes document, in the case shown for an educational course on Early Childhood Education. The print version shown is published in form at which an educator of the course could review the course model 216. Other published forms may include a web page displaying the same content. Based on how the Course Objectives 212 are entered by an educator, there may be primary Course Objectives 810 with subsidiary Course Objectives 820 in some embodiments. These can be automatically completed in the document using the information at the Course Model Level 310 entered by an educator, exemplifying efficiencies to be gained by using the backward design flow implemented by the IDDI.

FIG. 9 illustrates a printed version 900 of a Course Model document, in the case shown for an educational course on Early Childhood Education. The print version shown would be one published form in which an educator of the course could review the course model 216, but other published forms may include a web page displaying the same content. The various headings shown, such as the Lesson 1 heading 910, can be automatically completed based on the information at the Course Model Level 310 entered by an educator.

Figure 10:
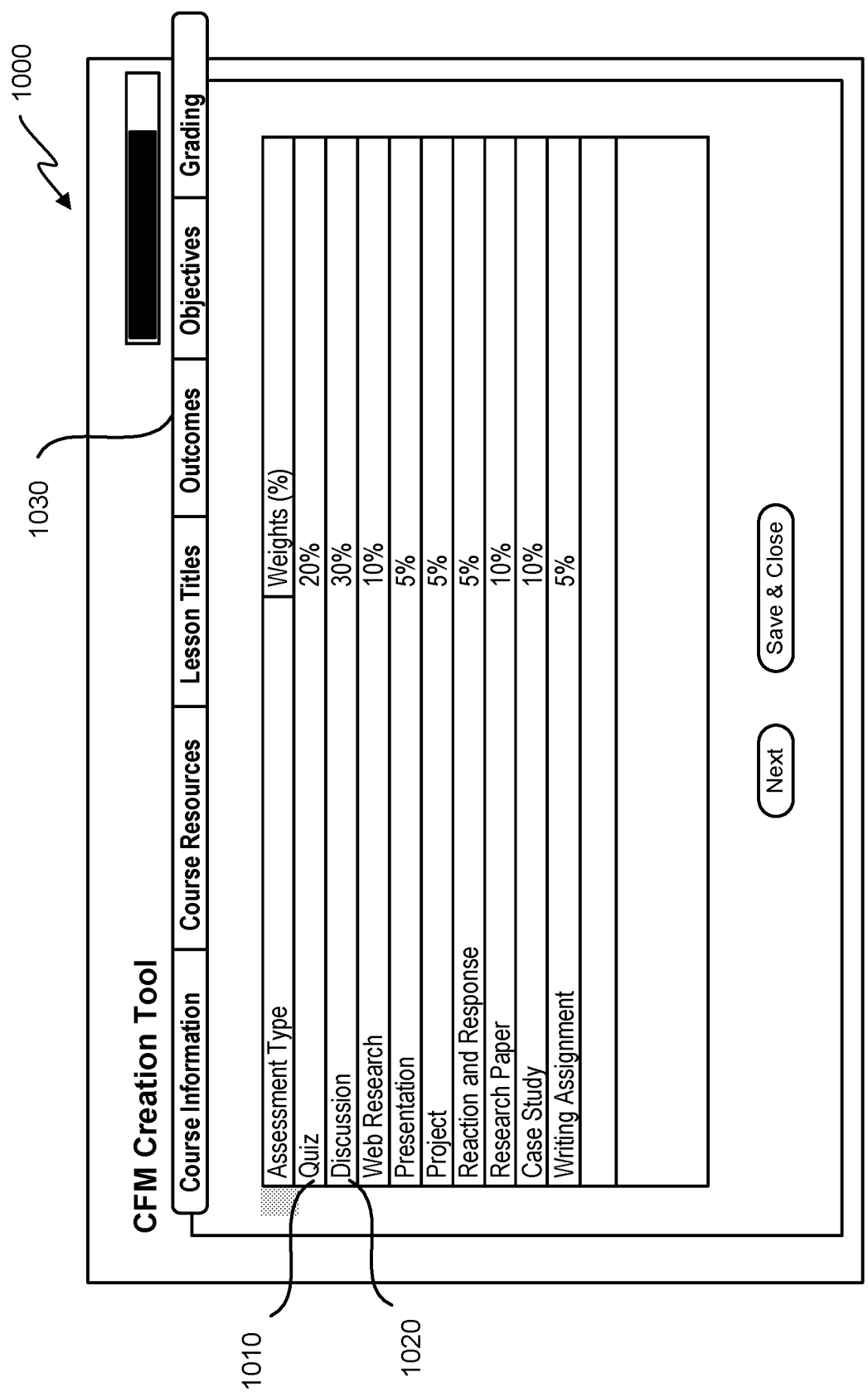
FIG. 10 illustrates a user interface for entering information for a course grading system, according to an embodiment.

FIG. 10 illustrates a user interface 1000 by which a user can enter information for a course grading system, according to an embodiment. The interface would be used primarily to enter particular content in the Assessments 338 at the Lesson Presentation Level 330. Based on the content already entered at the Course Model Level 310 and/or the Course Foundation Material Level 320, some of the fields of the user interface 1000 are completed before the user receives the user interface. For example, information in the Course Outline 222 may be have been used to automatically populate the interface with the Quiz field 1010 and the Discussion field 1020. The interface may also allow the user to access Course Outcomes 214 through a call back button 1030. Accessing and editing the Course Outcomes 214 would cause the IDDI automatically to update the course model 216 and various components of the lower levels 320 and 330.

Figure 11:
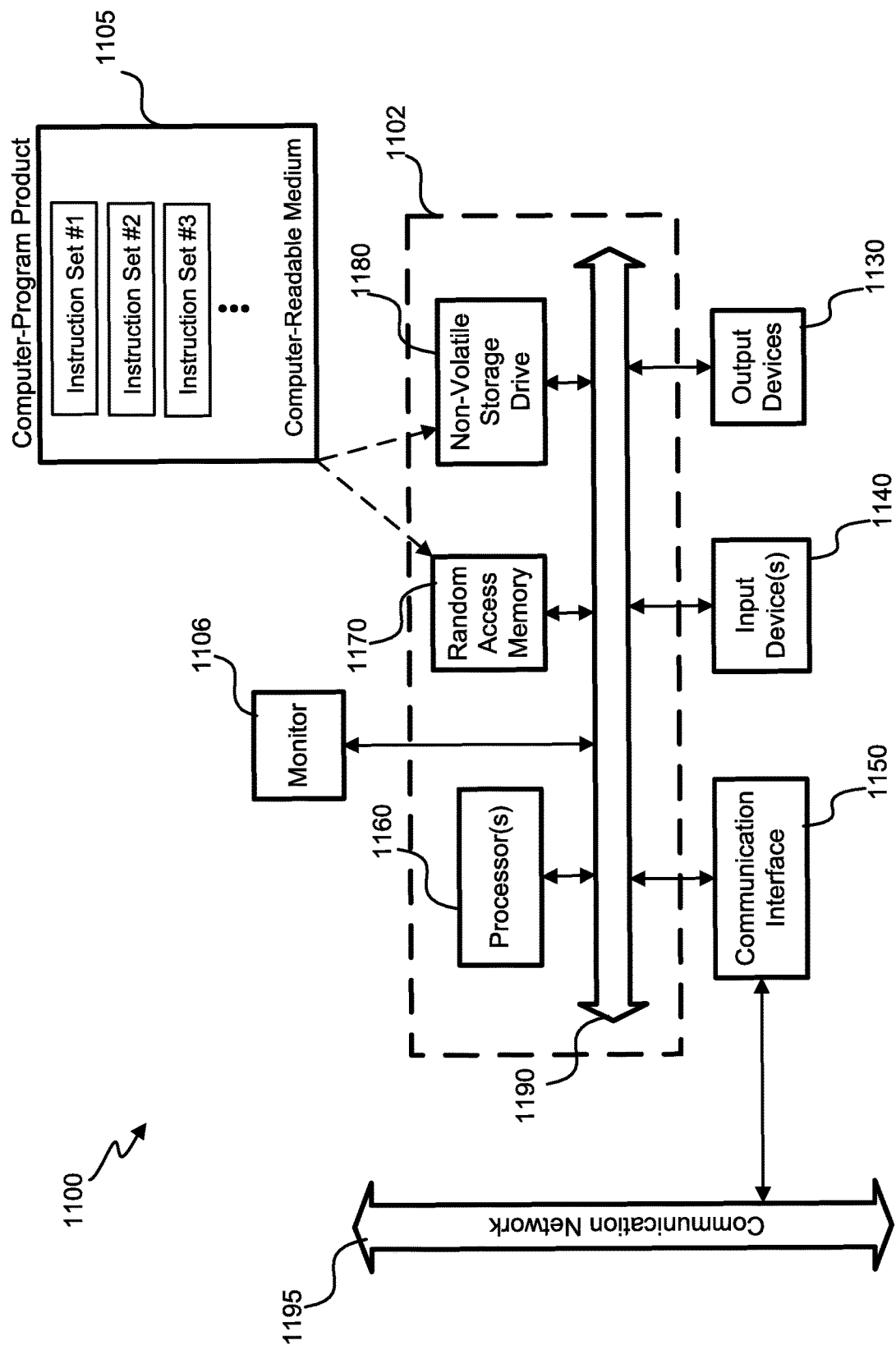
FIG. 11 illustrates a computer system.

FIG. 11 shows an embodiment of a computer system 1100 capable of implementing one or more of the methods disclosed above. For example, one or more special-purpose computer systems 1100 can be used to provide the Instructional Design and Development Interface 200. The above methods can be implemented by means of a computer-program product 1105 that direct a computer system to perform the actions of the above-described methods and components. Each such computer-program product can comprise sets of instructions (codes) embodied on a computer-readable medium that directs the processor of the computer system to perform corresponding actions. The instructions can be configured to run in sequential order, or in parallel (such as under different processing threads), or in a combination thereof. The computer-program products can be loaded into the computer system 1102.

The computer system 1100 may comprise a monitor 1106, one or more additional user output devices 1140, one or more user input devices 1140 (e.g., keyboard, mouse, track ball, touch screen) coupled to a main computing subsystem 1102, an optional communications interface 1150 coupled to the computing subsystem 1102, a computer-program product 1105 stored in a tangible computer-readable memory in computer subsystem 1102. Computer-program product 1105 directs system 1100 to perform the above-described methods. Computing subsystem 1102 can include one or more processors 1160 that communicate with a number of peripheral devices via a bus subsystem 1190. These peripheral devices can include user output device(s) 1140, user input device(s) 1140, communications interface 1150, and a storage subsystem, such as random access memory (RAM) 1170 and non-volatile storage drive 1180 (e.g., disk drive, optical drive, solid state drive), which are forms of tangible computer-readable memory.

Computer-program product 1105 can be stored in non-volatile storage drive 1190 or another computer-readable medium accessible to computing subsystem 1102 and loaded into memory 1170. Each processor 1160 can comprise a microprocessor, such as a microprocessor from Intel® or Advanced Micro Devices, Inc®, or the like. To support computer-program product 1105, the computing subsystem 1102 runs an operating system that handles the communications of product 1105 with the above-noted components, as well as the communications between the above-noted components in support of the computer-program product 1105. Exemplary operating systems include Windows® or the like from Microsoft Corporation, Solaris® from Sun Microsystems, LINUX, UNIX, and the like.

User input devices 1140 include all possible types of devices and mechanisms to input information to computing subsystem 1102. These can include a keyboard, a keypad, a mouse, a scanner, a digital drawing pad, a touch screen incorporated into the display, audio input devices such as voice recognition systems, microphones, and other types of input devices. In various embodiments, user input devices 1140 are typically embodied as a computer mouse, a trackball, a track pad, a joystick, wireless remote, a drawing tablet, a voice command system. User input devices 1140 typically allow a user to select objects, icons, text and the like that appear on the monitor 1106 via a command such as a click of a button or the like. User output devices 1130 include all possible types of devices and mechanisms to output information from computing subsystem 1102. These can include a display (e.g., monitor 1106), printers, non-visual displays such as audio output devices, etc.

Communications interface 1150 provides an interface to other communication networks and devices and can serve as an interface to receive data from and transmit data to other systems, WANs and/or the Internet 1195. Embodiments of communications interface 1150 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1150 can be coupled to a computer network, to a FireWire® bus, or the like. In other embodiments, communications interface 1150 can be physically integrated on the motherboard of computing subsystem 1102, and/or can be a software program, or the like.

RAM 1170 and non-volatile storage drive 1180 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1170 and non-volatile storage drive 1180 can be configured to store the basic programming and data constructs that provide the functionality of various embodiments of the present invention, as described above.

Software instruction sets that provide the functionality of the present invention can be stored in RAM 1170 and non-volatile storage drive 1180. These instruction sets or code can be executed by processor(s) 1160. RAM 1170 and non-volatile storage drive 1180 can also provide a repository to store data and data structures used in accordance with the present invention. RAM 1170 and non-volatile storage drive 1180 can include a number of memories including a main random access memory (RAM) to store of instructions and data during program execution and a read-only memory (ROM) in which fixed instructions are stored. RAM 1170 and non-volatile storage drive 1180 can include a file storage subsystem providing persistent (non-volatile) storage of program and/or data files. RAM 1170 and non-volatile storage drive 1180 can also include removable storage systems, such as removable flash memory.

Bus subsystem 1190 provides a mechanism to allow the various components and subsystems of computing subsystem 1102 communicate with each other as intended. Although bus subsystem 1190 is shown schematically as a single bus, alternative embodiments of the bus subsystem can utilize multiple busses or communication paths within computer 1100.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system comprising:
a database coupled to a network and storing:
a plurality of course objectives,
a plurality of course outcomes, and
a plurality of course models;
a server, including a computing device coupled to the network and including at least one processor executing instructions within memory which, when executed, cause the system to:
generate a first graphical user interface (GUI);
transmit the first GUI to a course creator client device coupled to the network;
receive, with a course model creation engine including inputs connected to one or more course creation interfaces and the database and an output connected to a course component creation engine, from the course creator client device:
a course objective associated with a goal to be achieved by a student enrolled in an educational course, and
a course outcome associated with a skill demonstrating at least partial achievement of a corresponding course objective;
generate a course model based on the course objective and the course outcome, wherein the course model maps the course objective to the course outcome;
execute a database command storing the course objective, the course outcome, and the course model in association in the database;
automatically generate, with the course component creation engine, from the course objective and the course outcome, a course outline, a lesson plan, and a course syllabus, wherein the course component creation engine includes an input connected to the course model creation engine and an output connected to the database;
generate a second GUI including the course outline, the lesson plan, and the course syllabus, wherein the course outline, wherein the second GUI is at least partially prepopulated automatically with data from the course model;
transmit the second GUI to the course creator client device;
receive course information from the course creator client device;
automatically execute a database command updating the course model based on the course information; and
automatically generate and transmit, to the course creator client device, an updated course outline, an updated lesson plan, and an updated course syllabus based on the updated course model.

2. The system of claim 1, wherein the instructions further cause the system to generate the course model utilizing at least two of: a lesson presentation, the course syllabus, the course outline, a lesson structure, and a course topics list.

3. The system of claim 1, wherein the instructions further cause the system to:
receive, from the course creator client device, an additional data associated with the course objective or the course outcome; and
update the course model to reflect the additional data.

4. The system of claim 1, wherein the instructions further cause the system to:
generate a preliminary common interface; and
receive, via the preliminary common interface from at least one source other than the course creator client device, a secondary course input, wherein the updated course outline, the updated lesson plan, and the updated course syllabus are generated based on the secondary course input.

5. The system of claim 1, wherein the instructions further cause the system to:
execute a database command selecting, from the database, a progress checklist associated with the course model; and
generate, for display on the first GUI or the second GUI, the progress checklist.

6. The system of claim 1, wherein the instructions further cause the system to organize the course outline according to a hierarchy of levels.

7. The system of claim 1, wherein the instructions further cause the system to associate, within the database, the course outline, the lesson plan, or the course syllabus with a textbook, at least one reading assignment, a course title, at least one course assessment, or at least one visual instruction media.

8. A method comprising:
generating, by a server comprising a computing device coupled to the network and comprising at least one processor executing instructions within memory, a first graphical user interface (GUI);
transmitting, by the server, the first GUI to a course creator client device;
receiving, with a course model creation engine including inputs connected to one or more course creation interfaces and a database storing at least one course objective, at least one course outcome, and at least one course model and an output connected to a course component creation engine, by the server from the course creator client device:
a course objective associated with a goal to be achieved by a student enrolled in an educational course, and
a course outcome associated with a skill demonstrating at least partial achievement of a corresponding course objective;
generating, by the server, a course model based on the course objective and the course outcome, wherein the course model maps the course objective to the course outcome;
executing, by the server, a database command storing the course model in the database coupled to the network;
automatically generating, with the course component creation engine, by the server from the course objective and the course outcome, a course outline, a lesson plan, and a course syllabus, wherein the course component creation engine includes an input connected to the course model creation engine and an output connected to the database;
generating, by the server, a second GUI including the course outline, the lesson plan, and the course syllabus, wherein the second GUI is at least partially prepopulated automatically with data from the course model;
transmitting, by the server, the second GUI to the course creator client device;

receiving, by the server, course information received via the second GUI from the course creator client device;

automatically executing, by the server, a database command updating the course model based on the course information; and automatically generating and transmitting, by the server, to the course creator client device, an updated course outline, an updated lesson plan, and an updated course syllabus based on the updated course model.

9. The method of claim 8, further comprising the step of generating, by the server, the course model utilizing at least two of: a lesson presentation, the course syllabus, the course outline, a lesson structure, and a course topics list.

10. The method of claim 8, further comprising the steps of:

receiving, by the server from the course creator client device, an additional data associated with the course objective or the course outcome; and updating, by the server, the course model to reflect the additional data.

11. The method of claim 8, further comprising the steps of:

generating, by the server, a preliminary common interface; and receiving, by the server via the preliminary common interface from at least one additional source other than the course creator client device, a secondary course input, wherein the updated course outline, the updated lesson plan, and the updated course syllabus are generated based on the secondary course input.

12. The method of claim 8, further comprising the steps of:

executing, by the server, a database command selecting, from the database, a progress checklist associated with the course model; and generating, by the server for display on the second GUI, the progress checklist.

13. The method of claim 8, further comprising the step of organizing, by the server, the course outline according to a hierarchy of levels.

14. The method of claim 8, further comprising the step of associating, by the server within the database, the course outline, the lesson plan, or the course syllabus with a textbook, at least one reading assignment, a course title, at least one course assessment, and at least one visual instruction media.

15. A system comprising a server, including a computing device coupled to the network and including at least one processor executing instructions within memory which, when executed, cause the system to:

generate a first graphical user interface (GUI);

transmit the first GUI to a course creator client device;

receive, with a course model creation engine including inputs connected to one or more course creation interfaces and a database coupled to the network, the database storing at least one course objective, at least one course outcome, and at least one course model, and an output connected to a course component creation engine, from the course creator client device:

a course objective associated with a goal to be achieved by a student taking an educational course, and a course outcome associated with a skill demonstrating at least partial achievement of a corresponding course objective;

generate a course model based on the course objective and the course outcome, wherein the course model maps the course objective to the course outcome;

execute a database command storing the course objective, the course outcome, and the course model in the database coupled to the network;

automatically generate, with the course component creation engine, from the course objective and the course outcome, a course outline, a lesson plan, and a course syllabus, wherein the course component creation engine includes an input connected to the course model creation engine and an output connected to the database;

generate a second GUI including the course outline, the lesson plan, and the course syllabus, wherein the second GUI is at least partially prepopulated automatically with data from the course model;

transmit the second GUI to the course creator client device;

receive course information from the course creator client device;

automatically execute a database command updating the course model based on the course information; and automatically generate and transmit, to the course creator client device, an updated course outline, an updated lesson plan, and an updated course syllabus based on the updated course model.

16. The system of claim 15, wherein the instructions further cause the system to generate the course model utilizing at least two of: a lesson presentation, the course syllabus, the course outline, a lesson structure, and a course topics list.

17. The system of claim 15, wherein the instructions further cause the system to:

receive, from the course creator client device, an additional data associated with the course objective or the course outcome; and update the course model to reflect the additional data.

18. The system of claim 15, wherein the instructions further cause the system to:

generate a preliminary common interface; and receive, via the preliminary common interface from at least one additional source other than the course creator client device, a secondary course input, wherein the updated course outline, the updated lesson plan, and the updated course syllabus are generated based on the secondary course input.

19. The system of claim 15, wherein the instructions further cause the system to:

execute a database command selecting, from the database, a progress checklist associated with the course model; and generate, for display on the second GUI, the progress checklist.

20. The system of claim 15, wherein the instructions further cause the system to organize the course outline according to a hierarchy of levels.

* * * * *